United States Patent [19]

Lieberman

[11] Patent Number: 4,945,462
[45] Date of Patent: Jul. 31, 1990

[54] ZERO-CURRENT SWITCHING DC TO DC FULL-WAVE MODE CONVERTER

[76] Inventor: Lev A. Lieberman, 5/12 Dror Street, Rishon LeZion, Israel, 75305

[21] Appl. No.: 298,023

[22] Filed: Jan. 18, 1989

[30] Foreign Application Priority Data

Jan. 19, 1988 [IL] Israel ......................... 85138

[51] Int. Cl.$^5$ .......................... H02M 3/335
[52] U.S. Cl. ......................... 363/17; 363/132
[58] Field of Search ...................... 363/17-25, 363/95-98, 131-134

[56] References Cited

U.S. PATENT DOCUMENTS

| | | | |
|---|---|---|---|
| 4,523,269 | 6/1985 | Baker et al. | 363/98 X |
| 4,563,731 | 1/1986 | Sato et al. | 363/17 |
| 4,679,129 | 7/1987 | Sakakibara et al. | 363/17 |
| 4,794,506 | 12/1988 | Hino et al. | 363/17 X |

OTHER PUBLICATIONS

"Modern DC to DC Switchmode Power Converter Circuits", Severns et al., 1985, pp. 262-324.
"Secondary-Side Resonance for High-Frequency Power Conversion", Liu et al., IEEE Applied Power Electronics Conference, Apr. 28-May 1, 1986, pp. 83-89.

Primary Examiner—Mark O. Budd
Assistant Examiner—Emanuel Todd Voeltz
Attorney, Agent, or Firm—Fleit, Jacobson, Cohn, Price, Holman & Stern

[57] ABSTRACT

A zero-current switching DC to DC full-wave mode converter, having a controllable DC to AC converter including electronic switches for selectively coupling a source of voltage across a primary winding of a power transformer circuit when the current flow through the switches is substantially negligible, AC to DC converter connected to secondary windings of the power transformer circuit, two charging and energy storing circuits each including a storage capacitor connected in series with one of the secondary windings and further including an inductor unit connected in circuit between the input of the DC to AC converter and the storage capacitor and at least one discharging circuit connected across the storage capacitors and being connectable via a first and a second terminal to a load, the discharging circuit including at least one discharging inductor connected between one side of the storage capacitor and the first terminal, wherein the charging period of the storage capacitor is smaller than the discharging period thereof.

8 Claims, 3 Drawing Sheets

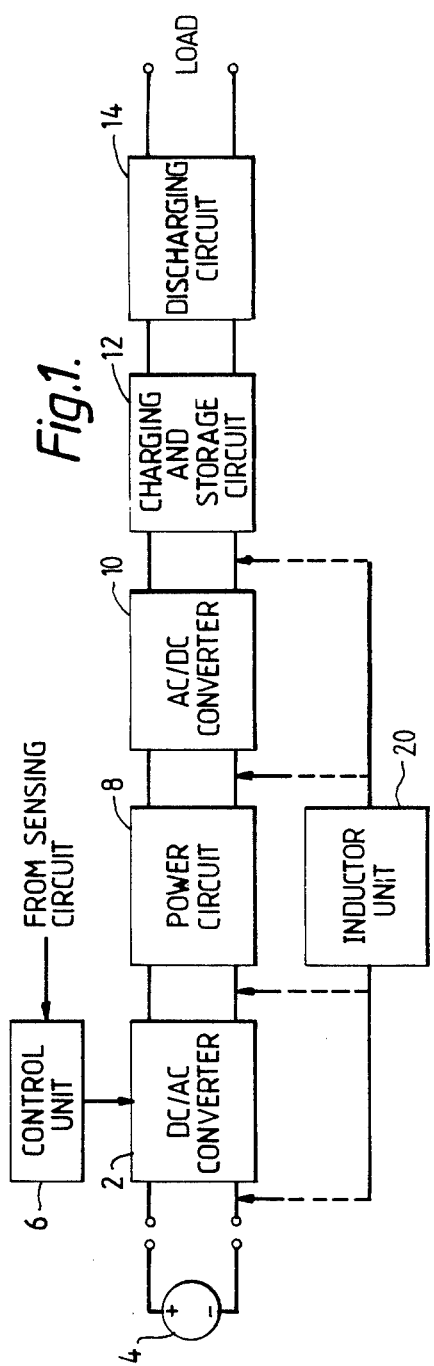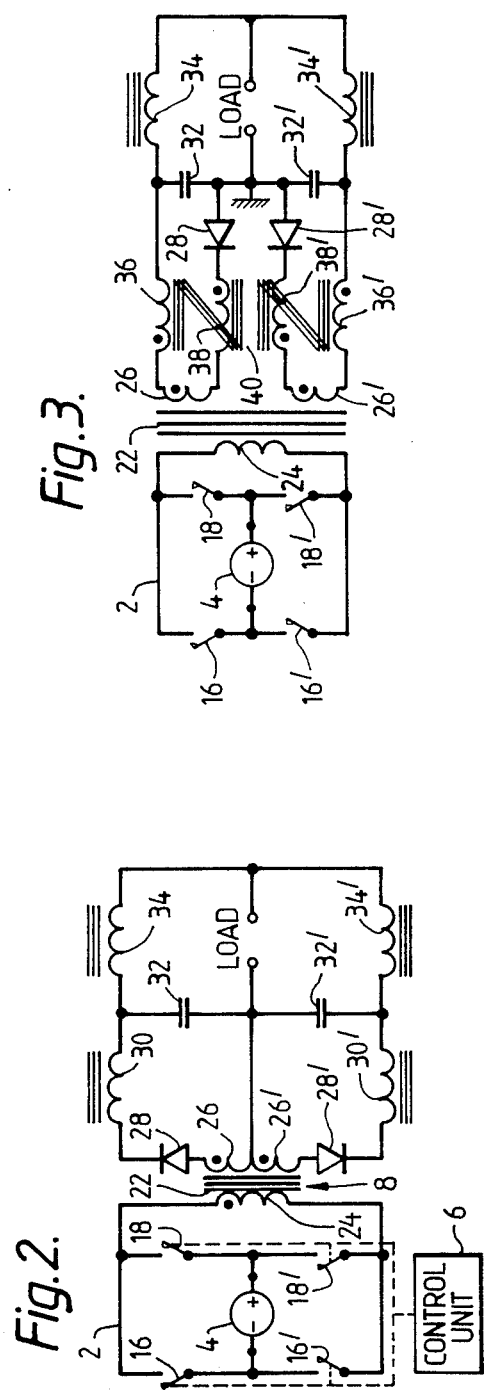

ZERO-CURRENT SWITCHING DC TO DC FULL-WAVE MODE CONVERTER

The present invention relates to DC to DC power converters and more particularly to full-wave mode zero current switching, DC to DC converters.

There are known in the art half-wave zero-current switching converters, however, no full-wave mode converter of this type has heretofore been suggested.

It is generally desired to design DC to DC converters operating at high frequencies, thereby facilitating a decrease in the overall volume and weight of the device due to the ability to use smaller size components. In addition to the use of relatively small components, the increase in operating frequency achieves a decrease in the internal resistance of the converter thereby improving load regulation characteristics of the converter. On the other hand, however, the increase of the working frequency of a converter increases switching losses as the high-rate switching is performed under the prevailing working current. Other losses across the circuit components such as, losses across the semi-conductor devices of the circuit are also exhibited due to the instantaneously or abrupt change of the voltage polarity thereacross.

Hence, it has long been the desire to design a high-frequency, DC to DC converter of increased power density, not suffering from the above-described disadvantages.

It is therefore a broad object of the present invention to ameliorate the disadvantages of the known DC to DC converters and to provide a full-wave mode zero-current switching DC to DC converter.

Accordingly, there is provided a zero-current switching DC to DC full-wave mode converter, comprising a controllable DC to AC converter including electronic switching means for selectively coupling a source of voltage across a primary winding of a power transformer circuit when the current flow through said switching means is substantially negligible, AC to DC converter connected to secondary windings of said power transformer circuit, two charging and energy storing circuits each including a storage capacitor connected in series with one of said secondary windings and further including an inductor unit connected in circuit between the input of said DC to AC converter and said storage capacitor and, at least one discharging circuit connected across said storage capacitors and being connectable via a first and a second terminal to a load, said discharging circuit including at least one discharging inductor connected between one side of said storage capacitor and said first terminal, wherein the charging period of said storage capacitor is smaller than the discharging period thereof.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a block diagram illustrating the various embodiments of the converter according to the invention;

FIG. 2 is a circuit diagram of a preferred embodiment of a converter of the present invention;

FIG. 3 is a circuit diagram of another embodiment of the converter;

Figure 4:
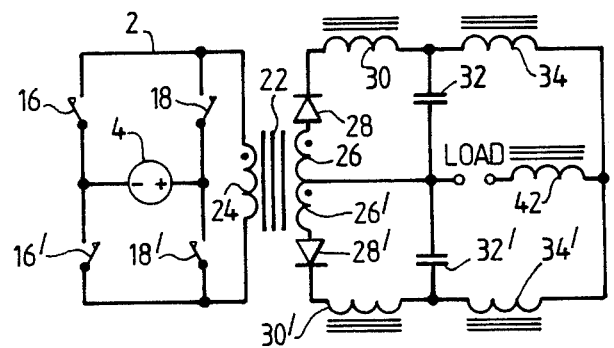
FIG. 4 is a circuit diagram of a further embodiment of the converter.

Referring to FIG. 1, there is shown a block diagram illustrating in a simplified manner various possible embodiments of the zero-current switching DC to DC full-wave mode converter. The DC to DC converter is composed of a DC to AC converter 2, connectable between a voltage source 4 and a power circuit 8. The converter 2 is controlled by a control unit 6 which, in turn, receives signals from one or more sensors which may be affixed in the converter's circuit at several possible places for sensing energy flow states therein. As the control and sensing circuits are known per-se and do not form a part of this invention, no further explanation regarding the operation thereof is necessary for the full understanding of the present invention.

The output from the DC to AC converter 2, leads to a power circuit 8 which feeds via an AC to DC converter 10 a charging and energy storage circuit 12. The latter leads to a discharging circuit 14 to which a load is connectable.

Further seen in the figure is an inductor unit 20, which as will be described hereinafter, could be connected in circuit at four locations as indicated by the broken lines.

A preferred embodiment of the invention is illustrated in the circuit diagram of FIG. 2. Seen is the DC to AC converter 2 composed of electronic switches 16,18,16',18' controlled in synchronization by the control unit 6 and connectable to the power circuit 8 which includes a transformer 22 having a primary winding 24 and secondary windings 26,26'. Two symmetrically arranged charging loops constituted by the AC to DC converter 10 which is composed of the unidirectional conducting elements 28,28' (for example, represented by diodes). Each of the elements 28,28' is connected in series on their one side with an adjacent secondary winding 26 or 26' and via the charging inductors 30 or 30', respectively, to a storage capacitor 32,32'. The discharging circuit paths include the capacitors 32,32' and the discharging inductors 34,34'. In this embodiment the inductances of inductors 30'30' are designed to be smaller than the inductances of the discharging inductors 34 and 34', respectively, in order to assure that the charging period of each of the capacitors 32, 32' is smaller than the discharging period thereof.

The operation of the DC to DC converter can now be explained with reference to FIGS. 1 and 2. When the voltage source 4 is connected and switched on, the selective actuations of the switches 16, 18, 16' and 18' of the DC to AC converter 2 forms, in the secondary windings 26,26' of the transformer 22, pulses of opposite phases. During the positive half of a cycle, respectively, in turn each of the unidirectional elements 28,28' will conduct and the storage capacitors 32,32' will charge via the charging inductors 30,30'. The discharge of the capacitors 32,32' is alternately effected through the discharge inductors 34,34' thereby forming a DC voltage across the load.

Since the inductances of the charging paths are smaller than the inductances of the discharging paths and the duration of the charging cycle is defined by the equation $t \approx \sqrt{L_{ch}C}$, where, $L_{CH}$ is the charging inductance, and C is the capacitance of the storage capacitor, the duration of the discharging cycle will be larger than that of the charging cycle as the capacitor is common to both, the charging and the dischaging paths.

The periodicity of the change of states of the switches of the DC to AC converter is determined by this duration, as sensed by a sensing circuit, and thus these switches are actuated to change state at zero, or negligible, current flow therethrough. This changeover of the switches states at zero current assures that the charging of one of the two storage capacitors commences at the same instant when the discharging of the other capacitor has ceased. The continuous uninterrupted alternate charging of two, substantially identical but separate circuits facilitates continuous retrieval of energy from the voltage source and therefore, the maximal input current will not exceed the average current flow by more than about 60%. This will result in a decrease of heat energy waste across the circuit components and thus, the reliability of which components will increase. Additionally, due to this reduction in the current flow, the cooling requirements of the circuit could be decreased.

Turning now to the discharge paths, as seen, the intensity of the current flow of the discharge paths substantially depends only on the load. Hence, the amount of energy which is discharged from the storage capacitor will depend on the size of the current flow in this path. Therefore, the amount of the energy which is discharged from the capacitor determines the voltage thereacross and, thus, the voltage level in which the charging at the next cycle of the capacitor will commence. The potentional across the storage capacitor at the termination of its charging is, inter alia, dependent on the charging voltage and the voltage thereacross at the beginning of the charging cycle. As the output voltage increases, the storage capacitor dissipates more energy, which energy in turn, is replenished by drawing more energy from the voltage source. Such a dependency between the input and output energy reduces the "internal resistance" of the converter and results in that the output voltage is almost independent of the size of the load. This independency may, in the prior art half-wave converters, have an adverse effect of causing a timewise "premature" charging of the storage capacitors. However, with the full-wave mode DC to DC converter according to the present invention, in which there exist, in each of the two charging and discharging loops, a common path, the voltage across a discharging capacitor can become lower than zero, i.e., have a reverse voltage thereacross and hence current flow during the discharge cycle is prevented, as long as the voltage level across the capacitor does not decrease below the voltage level across the secondary winding of the transformer to which it is connected. Also, in order to avoid reverse voltages on the capacitors, it is suggested to mount both charging inductors on a common core and to electrically interconnect the windings thereof so that the charging currents will produce in the core an AC magnetic flux of opposite directions. A practical embodiment of such an arrangement is shown in FIG. 3. Accordingly, there are two charging inductors, 36,38 and 36',38' in each of the charging circuits magnetically linked by a common core 40.

Referring to FIG. 4, there is illustrated an embodiment similar to the embodiment of FIG. 2 except for the additional inductor 42, which is connected in the common branch of both discharge paths. This added inductor has the effect of increasing the rate of discharge of the discharging inductor, resulting in improved performance of the converter.

Figure 5:
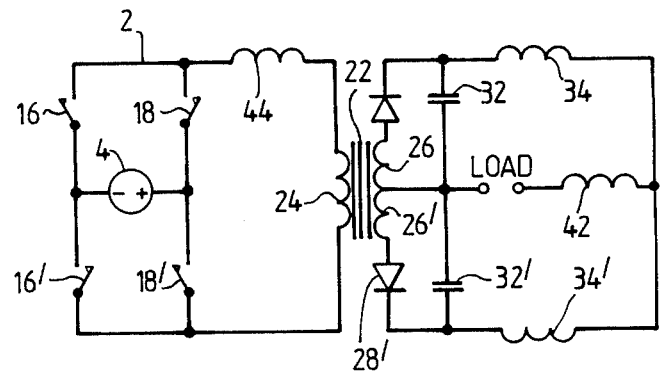
FIG. 5 is a circuit diagram of still a further embodiment of the converter with a charging inductor connected to the primary of the power transformer.

In FIG. 5 there is shown a converter similar to the one of FIG. 4 except for the charging inductor 44, which in this embodiment is connected in series with the primary winding 24 of the transformer 22, constituting a part of the power circuit.

Discharge inductors 34,34' of FIGS. 4 and 5 can be magnetically linked by a common core in order to avoid build-uP of reverse voltages on capacitors 32,32'.

Figure 6:
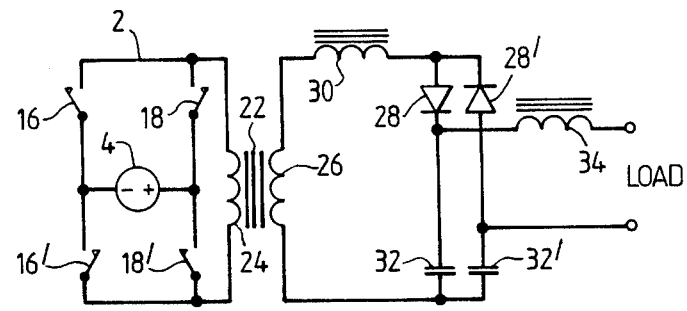
FIGS. 6 and 7 are circuit diagrams of modifications of the converter
according to the present invention.

Whereas in the above-described embodiments the storage capacitances are connected in parallel with respect to the load, in the embodiment of FIG. 6 there is illustrated a circuit diagram of a DC to DC converter in which the storage capacitors 32,32' are connected in series with respect to the load. This circuit is thus formed into a full-wave DC to DC converter voltage doubler. The same type of a circuit is illustrated in FIG. 7, however, with the difference that the charging inductor 44 is connected between the DC to Ac converter 2 and the transformer 22.

Figure 7:
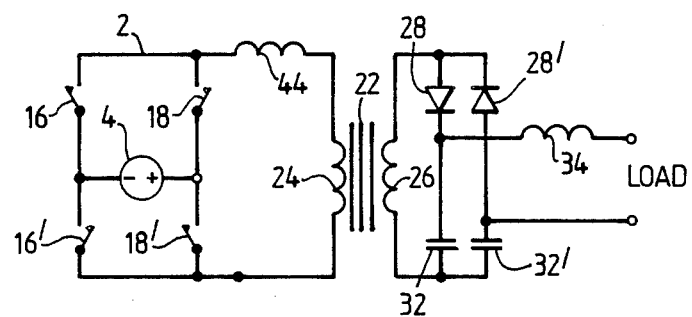

The voltage doubler of FIGS. 6 and 7 can be slightly modified by replacing the inductor 34 with a capacitor connected across the output terminals leading to the load. The function of the capacitor is analogous to that of the inductor 34, namely, to inhibit a change in the direction of the flow of current with respect to the load during one-half of the cycle.

Figure 8:
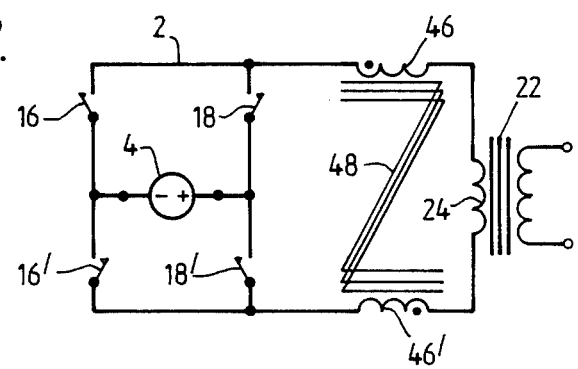
FIGS. 8 to 10 are circuit diagrams of various arrangements of the charging inductor in the power circuit according to the present invention.
Figure 9:
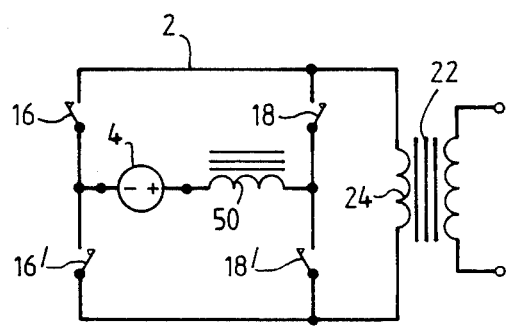
Figure 10:
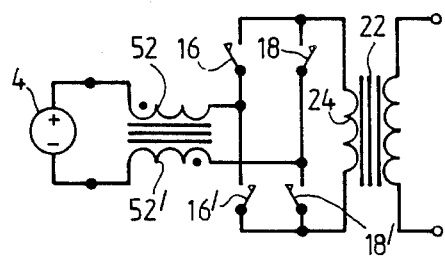

Experiments carried out with converters according to the present invention have shown that when operating the same at high frequencies there are advantages in providing between the DC to AC converter 2 and the transformer 22 two charging inductors 46,46' having a common core 48, forming magnetic fields of the same direction (see FIG. 8). A further alternative is shown in FIG. 9. Here the charging inductor 50 is connected between the voltage source 4 of the DC to AC converter and the switches 8 and 12. Still a further useful arrangement suitable for high frequency operation is shown in FIG. 10 where two charging windings 52'52", commonly wound on a core, are symmetrically connected in the DC to AC converter circuit between the source 4 and the switches 16,18,16' and 18'. The inductors 52 and 52' are interconnected on the core in such a way as to induce in the core magnetic flux of the same direction.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A zero-current switching DC to DC fullwave mode converter, comprising:
   a controllable DC to AC converter having an input connectable to a DC source of voltage and including electronic switching means for selectively coupling said DC source of voltage across a primary winding of a power transformer circuit when the current flow through said switching means is substantially negligible;
   AC to DC converter having an input connected to secondary windings of said power transformer circuit;
   two charging and energy storing circuits each including a storage capacitor connected in series with one of said secondary windings; an inductor unit connected in circuit in a location between said input of said DC to AC converter and said storage capacitor and,
   at least one discharging circuit connected across said storage capacitors and being connectable via a first and a second terminal to a load, said discharging circuit including at least one discharging inductor connected between one side of said storage capacitors and said first terminal, wherein the charging period each of said storage capacitors is smaller than the discharging period thereof.

2. The converter as claimed in claim 1 wherein said inductor unit is connected in series with said primary winding of said power transformer.

3. The converter as claimed in claim 1 wherein said inductor unit is connected in series with said secondary winding of said power transformer.

4. The converter as claimed in claim 1 wherein said inductor unit is connected between said secondary winding of said power transformer and said AC to DC converter.

5. The converter as claimed in claim 1 wherein said inductor unit is connected between the input of said AC to DC converter and said charging capacitor.

6. The converter a claimed in claim 1 wherein said AC to DC converter comprises unidirectional elements.

7. The converter as claimed in claim 6 wherein said unidirectional elements are diodes.

8. The converter as claimed in claim 1 wherein said inductor unit includes at least two inductors wound on a common magnetic core, said inductors being connected in circuit between said terminals and said primary winding.

* * * * *